Patented May 28, 1940

2,202,128

UNITED STATES PATENT OFFICE 2,202,128

LUBRICATING COMPOSITION

Charles C. Towne, Beacon, N. Y., and Wilfred N. Meyer, Pryse, Ky.

No Drawing. Application November 26, 1937, Serial No. 176,642

9 Claims. (Cl. 87—9)

This invention relates to lubricants and has to do particularly with the provision of a corrosion inhibitor in a lubricating composition and to the lubrication of bearings therewith whereby corrosion of the bearings is substantially prevented.

In the lubrication of bearings, particularly at high temperatures, difficulties with the corrosion of the bearings are often encountered. This trouble is especially acute in the case of bearings containing cadmium and silver alloys, although the invention is not limited to the lubrication of bearings containing such metals.

It has been found that the corrosion of bearings can be substantially retarded by applying to the bearings an inhibitor comprising a strong mineral acid. This may be done by adding small amounts of the acid to the lubricant with which the bearing is lubricated. In this way it has been found that corrosion can be substantially prevented, even in lubricating bearings at temperatures up to 300–350° F. or higher.

While the invention is limited to no particular theory, indications are that the action of the inhibitor is to become adsorbed directly on the bearing surfaces, or to cause reaction products with the lubricant which become adsorbed on the bearing surfaces, so as to prevent contact between the bearing materials and the lubricant. Such adsorption may serve two purposes, namely to prevent the bearing metal from causing catalytic oxidation of the oil or to prevent the lubricating oil, on oxidation, from corroding the bearings.

Mineral acids which we prefer to use are sulfuric and phosphoric acids. The amount of the acids used may vary between about 0.01% and 0.25% and preferably less than 0.1%, for example 0.02%. We prefer to use an acid of about 94% concentration although we have found that good results are obtained when considerable amounts of moisture are present.

A lubricant to which the inhibitor is added may be a lubricating oil, such as a crank case oil, gear oil, etc., or we may add the inhibitor to other types of lubricants, such as compounded lubricants, including gear compounds, lubricating grease compositions, etc. Good results may be obtained by adding the inhibitor to lubricating oils which have been refined by well known refining means, such as acid treating and neutralizing, acid treating and clay contacting, and solvent refining, by which impurities including acid bodies have been removed.

The following example will illustrate the invention as applied to a lubricating oil having a viscosity of about 500–700 Saybolt Universal at 100° F.

| Oil | Inhibitor | Amount | Lead index |
|---|---|---|---|
| 520 viscosity pale | None | None | 10 |
| Do | Sulfuric acid | 0.02 | 46 |
| Do | Phosphoric acid | 0.02 | 53 |
| 750 viscosity pale | None | None | 12 |
| Do | Phosphoric acid | 0.02 | 51 |

The "Lead index" given above is an arbitrary empirical figure which is the measure of resistivity of the oil to bearing corrosion. It is obtained by multiplying the lead number of the oil by 1,000. The lead number of the oil represents the maximum percentage of lead as lead naphthenate which can be added to the oil without corrosion when the bearing is immersed in the oil and the oil passed therethrough at a temperature of about 325–350° F. for five hours in the presence of air. The amount of corrosion is determined by weighing the bearing before and after the test. For example, if the oil has a lead index of 10, this means that 0.01% of lead as lead naphthenate is the maximum amount which can be added to the oil without corrosion of the bearing. It will be noted that in the above test sulfuric and phosphoric acid increased the lead index about five fold.

The present invention has the advantage of providing means for inhibiting corrosion of bearings lubricated by mineral oil lubricants, when operating under high temperatures or when operating under low temperatures even in the presence of moisture.

Obviously many modifications and variations of the invention, as hereinbefore set forth, may be made without departing from the spirit and scope thereof and therefore only such limitations should be imposed as are indicated in the appended claims.

We claim:

1. A method of lubricating bearings normally tending to become corroded when lubricated with lubricating oil which comprises applying to the bearings a mineral lubricating oil to which has been added about 0.01–0.25% of a concentrated strong mineral acid.

2. A method according to claim 1 in which the mineral acid is sulfuric acid of at least 94% strength.

3. A method according to claim 1 in which the mineral acid is phosphoric acid.

4. An oily lubricant comprising a mineral lubricating oil normally tending to cause bearing corrosion, and a small amount of the order of 0.01-0.25% of added concentrated strong mineral acid to retard said corrosion.

5. A crank case oil comprising a solvent refined lubricating oil normally tending to cause bearing corrosion, containing about 0.01 to 0.10% of a concentrated strong mineral acid whereby the corrosion tendency is substantially retarded.

6. A refined mineral lubricating oil normally tending to cause bearing corrosion, containing about 0.02% of added sulfuric acid of at least 94% strength whereby the corrosion tendency is substantially retarded.

7. A refined mineral lubricating oil normally tending to cause bearing corrosion, containing about 0.02% of added concentrated phosphoric acid whereby the corrosion tendency is substantially retarded.

8. An oily lubricant comprising a mineral lubricating oil, and about 0.01-0.25% of an added phosphorus acid of high concentration.

9. A crank case oil comprising essentially a solvent refined mineral lubricating oil, and about 0.01-0.25% of an added phosphoric acid of high concentration.

CHARLES C. TOWNE.
WILFRED N. MEYER.